(12) United States Patent
Anderson et al.

(10) Patent No.: US 6,999,595 B2
(45) Date of Patent: Feb. 14, 2006

(54) SLIDE-ON SPEAKER ASSEMBLY

(75) Inventors: Jeffrey Michael Anderson, Cary, NC (US); Travis Baldwin, Chapel Hill, NC (US); Mark Allan Casparian, Raleigh, NC (US); David Wayne Hill, Cary, NC (US); Brian Hargrove Leonard, Durham, NC (US); Herold Lester Rothrock, Raleigh, NC (US); James Stephen Rutledge, Durham, NC (US); Albert Ray Sauer, Raleigh, NC (US); Julie Elaine Tierney, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/158,663

(22) Filed: May 30, 2002

(65) Prior Publication Data

US 2003/0223609 A1    Dec. 4, 2003

(51) Int. Cl.
*H04R 25/00* (2006.01)

(52) U.S. Cl. ............ 381/333; 381/306; 381/388; 381/386

(58) Field of Classification Search ........... 381/333, 381/306, 398, 386, 388; 248/442.2, 918; 361/681, 682, 683; 181/141, 144, 199
See application file for complete search history.

(56) References Cited

U.S. PATENT DOCUMENTS

| | | | |
|---|---|---|---|
| 5,422,751 A | 6/1995 | Lewis et al. | 359/83 |
| 5,535,285 A | 7/1996 | Jwo | 381/188 |
| 5,633,943 A * | 5/1997 | Daniels et al. | 381/386 |
| 5,683,070 A | 11/1997 | Seed | 248/442.2 |
| 5,796,854 A | 8/1998 | Markow | 381/188 |
| 5,970,161 A * | 10/1999 | Takashima et al. | 381/386 |
| 6,144,360 A | 11/2000 | Evanicky et al. | 345/102 |

* cited by examiner

*Primary Examiner*—Huyen Le
*Assistant Examiner*—Tuan Duc Nguyen
(74) *Attorney, Agent, or Firm*—Jeanine S. Ray-Yarletts

(57) ABSTRACT

A portable system that provides audio to video displays or monitors includes a bezel with integrated speakers and integrated channels that slide onto the bezel of the monitors. The bezel with integrated speakers does not increase the lateral footprint of the monitor.

21 Claims, 11 Drawing Sheets

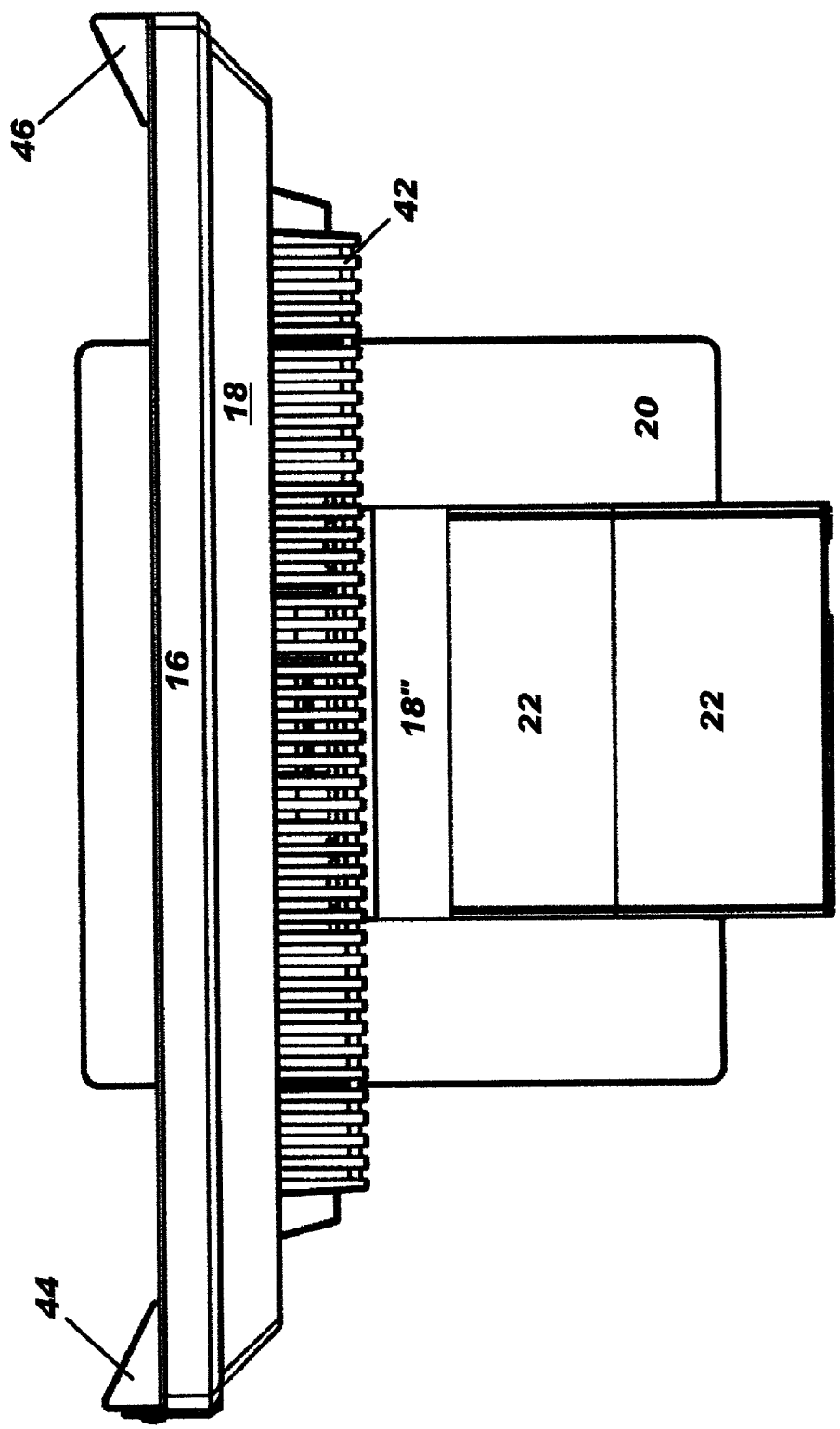

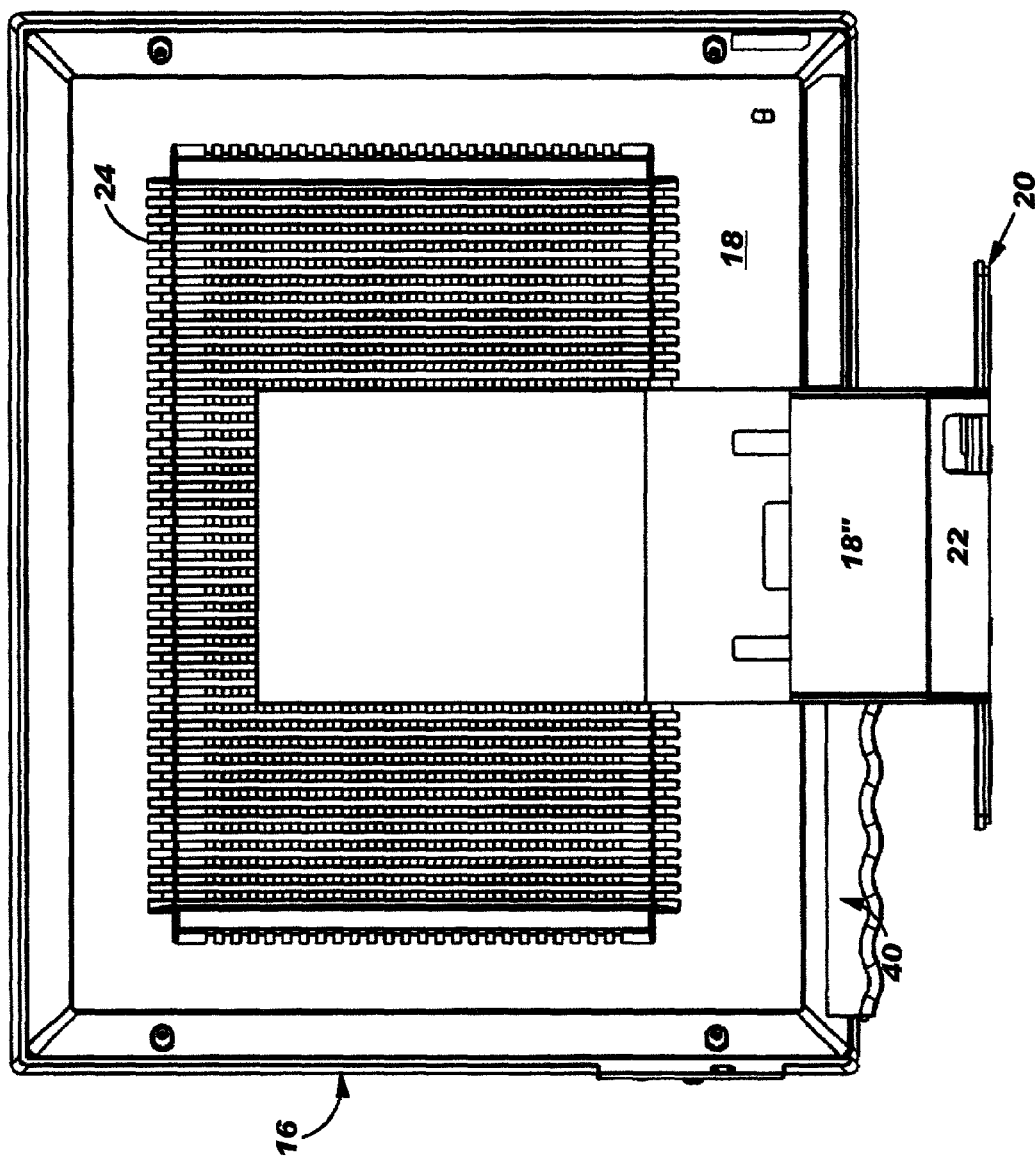

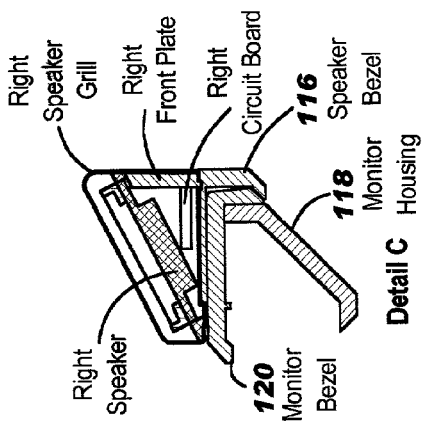
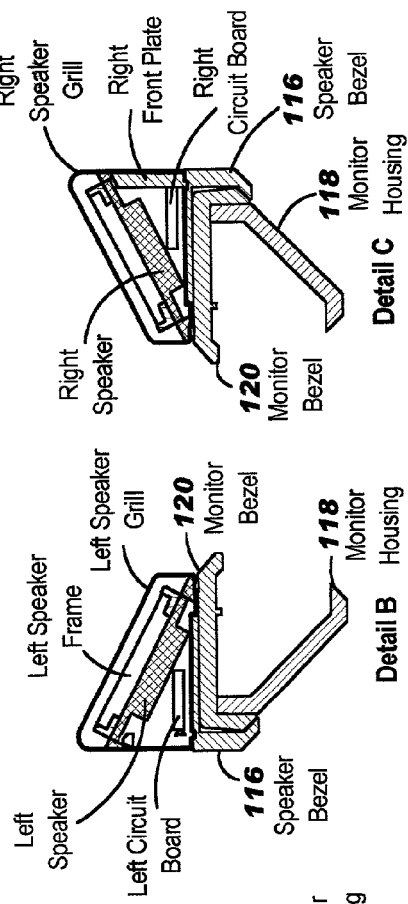
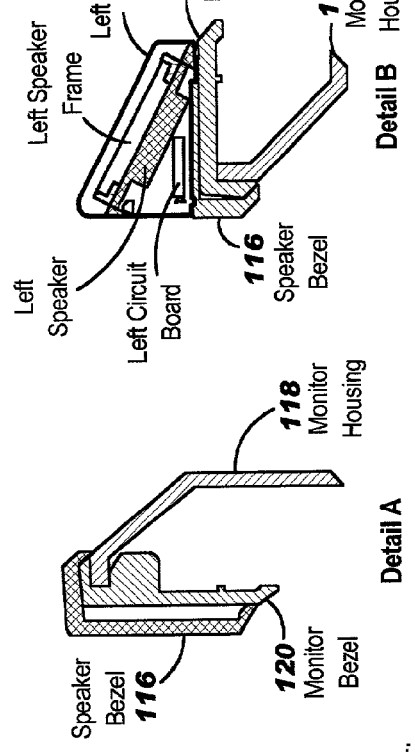
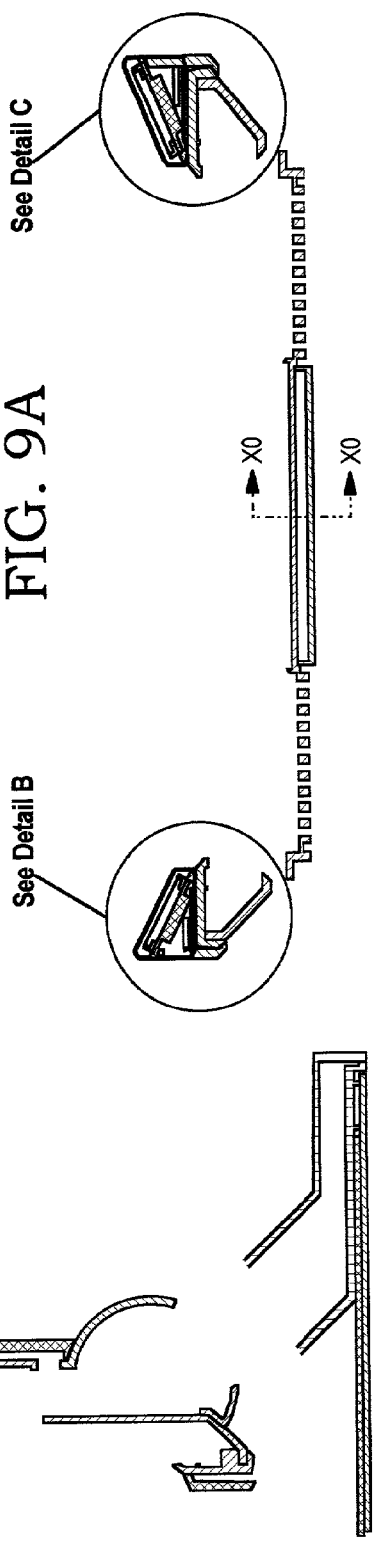

SLIDE-ON SPEAKER ASSEMBLY

BACKGROUND OF THE INVENTION

1) Field of the Invention

The present invention relates to the field of display technology in general and more particularly to monitors used in computer systems.

2) Prior Art

The use of monitors to display information generated in computer systems or other type of television related systems is well known in the prior art. The use of speaker systems to provide audio explaining what is being displayed or accompanying what is being displayed is also well known in the prior art. Probably, the most common type of speaker systems are standalone boxes which usually come in pairs and the user is free to place the boxes wherever the user chooses. Among the drawbacks associated with standalone speaker systems are bulkiness, difficulty in moving them around, etc.

The prior art has recognized the drawbacks associated with standalone speaker systems and have attempted to solve the problem by incorporating the speaker system in the housing of the monitor when the monitor is being manufactured. Even though this solution is probably a step in the right direction it too has problems. In the first instance monitors with built-in speakers are more expensive than monitors without speakers. The additional cost may adversely affect sales especially to buyers who do not want to pay an extra premium for the speaker systems.

The prior art has recognized the problems associated with monitors with built-in speakers and has attempted to solve it by providing speaker kits to be used to retrofit monitors. The retrofitting of monitors with speaker kits requires some type of adjustment (mechanical or electrical) to the base monitor. In one solution brackets have to be mounted on the base monitor and the speakers are then attached to the brackets.

In another solution hooks (mechanical or electrical) to accommodate speaker kits are built into the base model. The hooks usually include built-in wiring and circuits that add additional cost to the base monitor. In addition, the kit can only work with models that have the hooks built in them and is not backward compatible with models having no hooks.

Probably, a common problem with the prior art solutions is that add-on speakers are attached to the top, bottom or sides of the base monitor resulting in lateral extension of the footprint of the base model. The lateral extension is undesirable in that additional space which may not be available is required. For example, in one configuration termed "checkerboard" multiple flat panel monitors are mounted on a wall. This configuration allows multiple live TV news to be watched simultaneously. In the checkerboard configuration the monitors are placed in close proximity to one another. Therefore, add-on speakers that laterally increase the footprint of monitors could not be used in this checkerboard configuration.

Another problem with prior art add-on speakers is that the additions unnecessarily limit the motion of the monitor. For example, some monitors are mounted on pedestals which provide several degrees of motion, including rotary, swivel, etc., to the monitor. These motions would be curtailed with an add-on system that attaches to the bottom of the display.

In view of the above a speaker kit requiring no retrofitting of the base monitor does not limit motion of the base monitor or does not increase the footprint of the base monitor is required.

SUMMARY OF THE INVENTION

The present invention solves the above problems by providing a speaker bezel assembly having a "Slip-On" bezel with integrated speakers and channels that slides over the bezel of the base monitor when the speaker assembly is being attached or removed from the base monitor. Because the speaker bezel assembly slides on the monitor bezel when it is being attached and sits snugly (integrated) against the bezel of the monitor when said speaker bezel assembly is in its home position there are no lateral extensions of the base monitor. As a consequence the speaker bezel assembly is suitable for use in the checkerboard configuration of monitors.

More particularly, the speaker assembly includes a bezel with side members integrally connected to enclose an opening there between. The opening provides the space through which pictures on the display screen of the monitor can be viewed. The bezel includes a pair of integrated channels with each one of the pair being positioned on opposite ones of a pair of the side members. The channels allow the speaker bezel to be slid on the bezel of the display (hereinafter display bezel) and assists in retaining the speaker bezel against the display bezel when the bezel is in its home position. Speakers and associated electronics are also integrated into the bezel. Power cable and signal cables are also, operatively, coupled to the electronics.

Another benefit is that the bezel mount speaker assembly of the present invention provides backward compatibility in that it can be used without modifying the base monitors.

Finally, the bezel mount speaker solution does not impede the movement which was built in the base module.

BRIEF DESCRIPTION OF THE DRAWINGS

FIG. 7 shows a top plan view of the integrated speaker assembly fully mounted on the monitor according to the teachings of the present invention.

FIG. 8 shows a rear plan view of the integrated speaker assembly fully mounted on the monitor according to the teachings of the present invention.

FIG. 9, including 9A–9E, shows cross-sectional views of the speaker assembly mounted on the monitor according to the teachings of the present invention.

DETAILED DESCRIPTION OF THE PREFERRED EMBODIMENT

The bezel speaker assembly described herein can be used with any type of monitors. It works well with the flat panel monitors such as the IBM T541A and T560 flat panel monitors, and as such will be described in that environment. However, this should not be construed as a limitation upon the scope of the invention since it is well within the skill of one skilled in the art to make minor changes to the invention described herein and adopt the teachings to other types of monitors. The claims and teachings are intended to cover any type of minor modification to the disclosed invention.

Figure 17:
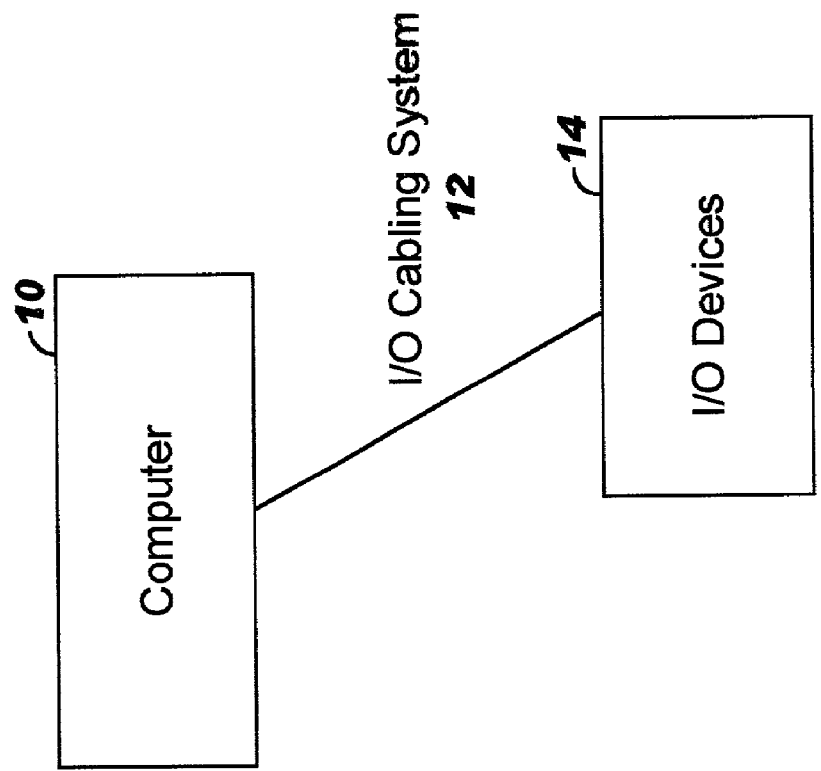
FIG. 17 shows a computer system in which the present invention is used.

FIG. 17 shows a block diagram of a computer system in which the present invention can be used. The computer system includes computer 10, I/O cabling system 12 and I/O devices 14. The I/O cabling system 12 interconnects the I/O devices 14 to the computer 10. The I/O devices 14 includes conventional I/O devices such as keyboards, monitors, scanners, pointing devices, etc. These types of I/O devices are well known in the prior art and therefore will not be discussed further. Suffice it to say that the present invention described herein provides a speaker assembly which can be attached to the bezel of the monitor.

Figure 1:
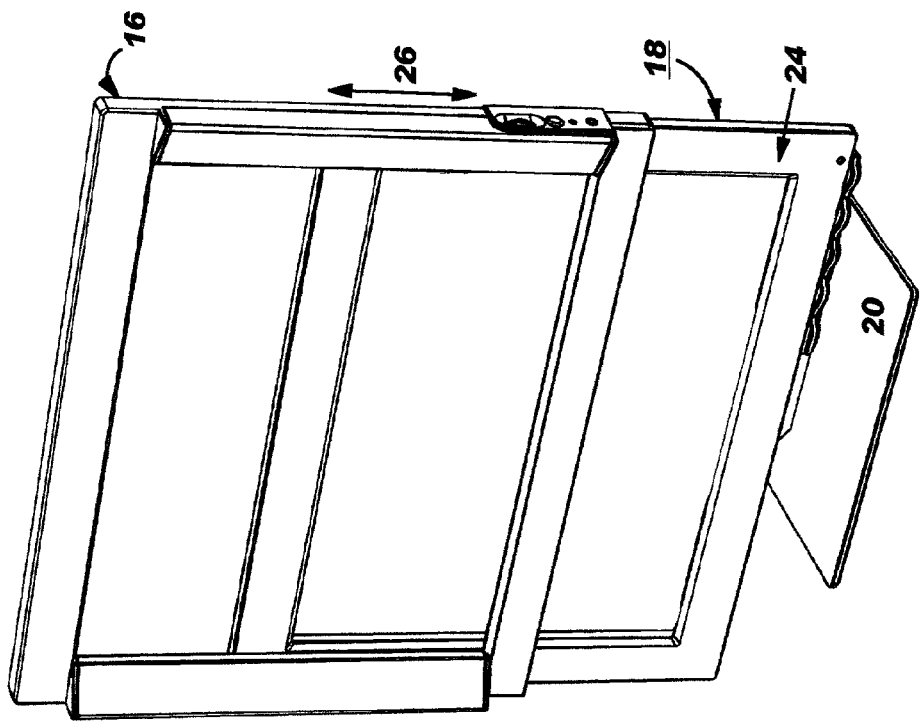
FIG. 1 shows a front perspective view of the integrated speaker assembly being removed or mounted onto a monitor according to the teachings of the present invention.

FIG. 1 shows a front perspective view of the integrated bezel speaker assembly 16 partially mounted to the bezel of a flat panel monitor 18. For purposes of distinction the bezel in which the speaker systems are integrated are referred to herein as "speaker bezel". Likewise, the bezel which surrounds the display panel of the flat panel monitor 18 is referred to as the "monitor bezel".

Figure 2:
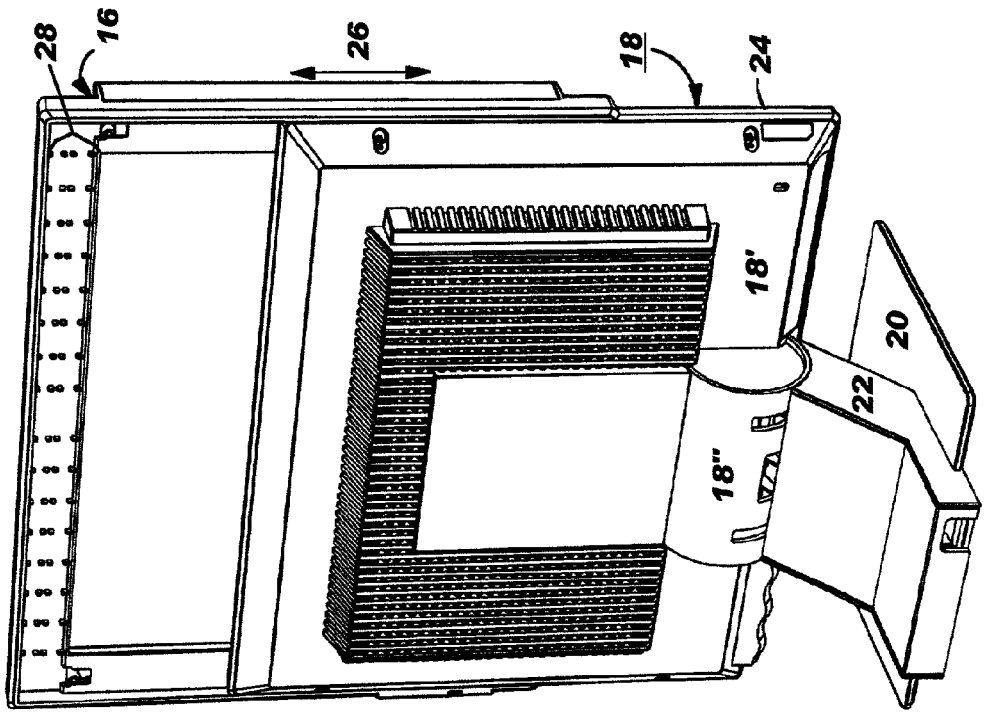
FIG. 2 shows a rear perspective view of the integrated speaker assembly partially mounted on the monitor according to the teachings of the present invention.

Turning to FIG. 2 for the moment, a rear prospective view of the partially mounted speaker bezel assembly 16 and the flat panel monitor 18 are shown. For purposes of description elements which are common are identified by the same numeral in the various views of the drawings. Referring to FIGS. 1 and 2 the flat panel monitor 18 includes base 20 fixedly connected to pedestal 22. The monitor housing 18' is coupled by coupling 18" to pedestal 22. The coupling 18" can take many conventional forms which allows the housing 18' to move relative to pedestal 22 and the base 20. For example, the motion may be rotary, swivel, etc. These types of coupling that provide motion to the monitor is well known in the prior art and will not be discussed further.

Still referring to FIGS. 1 and 2, the monitor 18 includes monitor bezel 24 that surrounds the display panel and is connected to housing 18'. As will be discussed in more detail herein, the speaker bezel of the integrated bezel speaker system is identical in shape and geometry to the monitor bezel. The speaker bezel is manufactured with surfaces and channels that slide on the surfaces of display bezel 24 in the directions shown by arrow 26 to be seated on the monitor or to be removed from the monitor. As is shown in FIGS. 1 and 2, to place the integrated bezel speaker assembly onto the flat panel monitor the lower portion of the speaker bezel is aligned with the top of the monitor bezel. The speaker bezel is then slid downwardly in the direction shown by arrow 26 until it reaches the bottom of the monitor whereat it is fully aligned with the monitor bezel and completely covers the monitor bezel from view. The speaker bezel is now placed in juxtaposition with the display bezel that surrounds the display screen of the monitor which can be viewed through the opening of the integrated bezel speaker assembly.

Turning to FIG. 2 for the moment, a plurality of guide members 28 are fabricated on the back surface of the speaker bezel. As will be explained subsequently, these guides are used to harness wires that are used to interconnect the speakers in the assembly.

Figure 4:
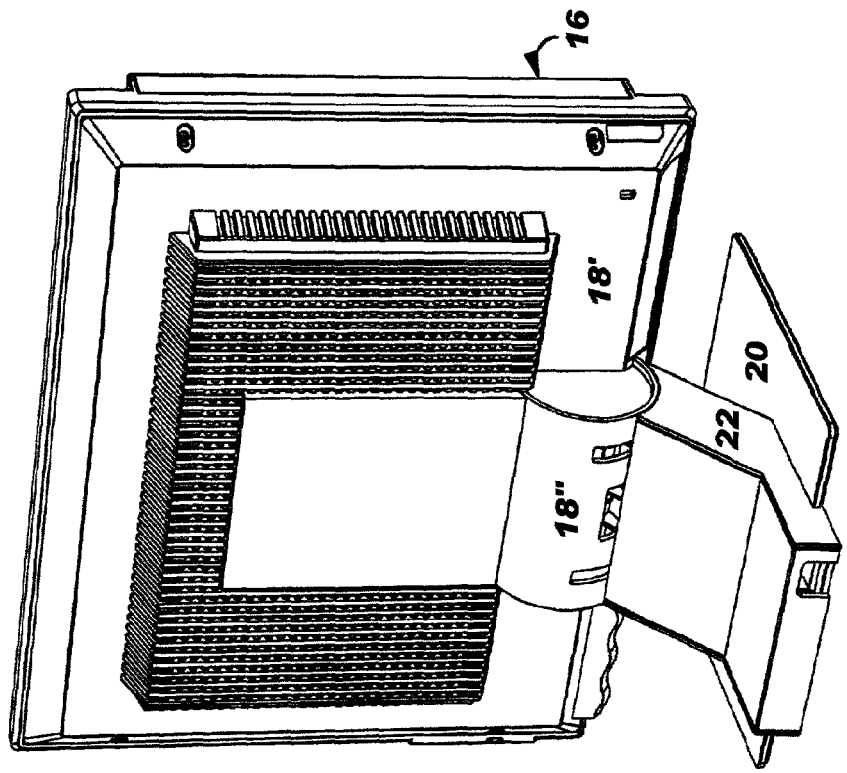
FIG. 4 shows a rear perspective view of the integrated speaker assembly fully mounted on the monitor according to the teachings of the present invention.
Figure 3:
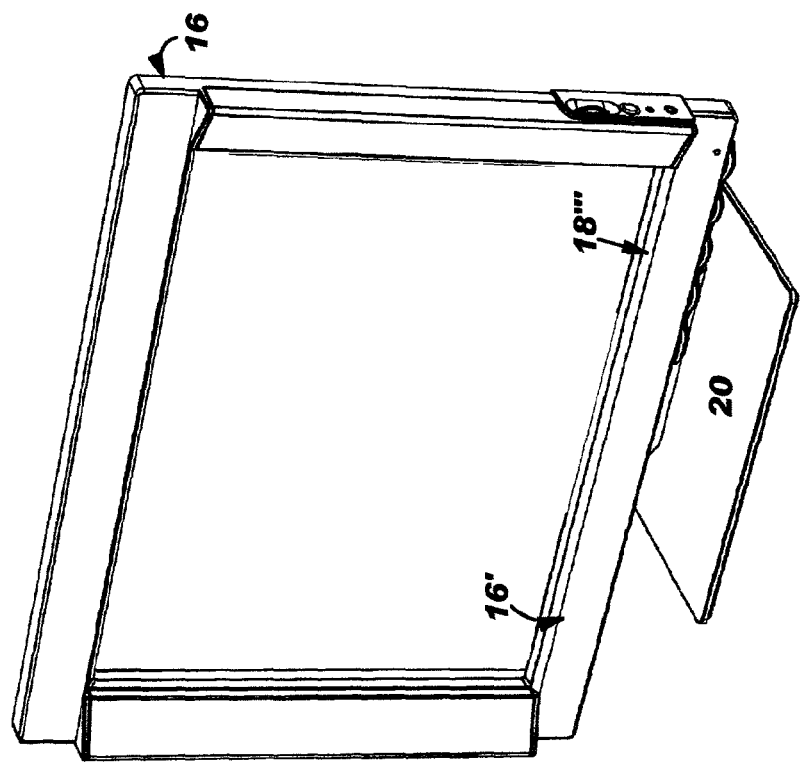
FIG. 3 shows a front perspective view of the integrated speaker assembly fully mounted (home position) on the monitor according to teachings of the present invention.

FIGS. 3 and 4 show front and rear prospective views of the integrated bezel speaker assembly 16 fully seated on the flat panel monitor. It should be noted that when fully seated the bezel speaker assembly is fully integrated with the monitor bezel and extends in the plane perpendicular to that of the viewing screen of the monitor. Surface 18''' of the monitor bezel and surface 16' of the speaker bezel are placed in juxtaposition surrounding the display screen.

Figure 6:
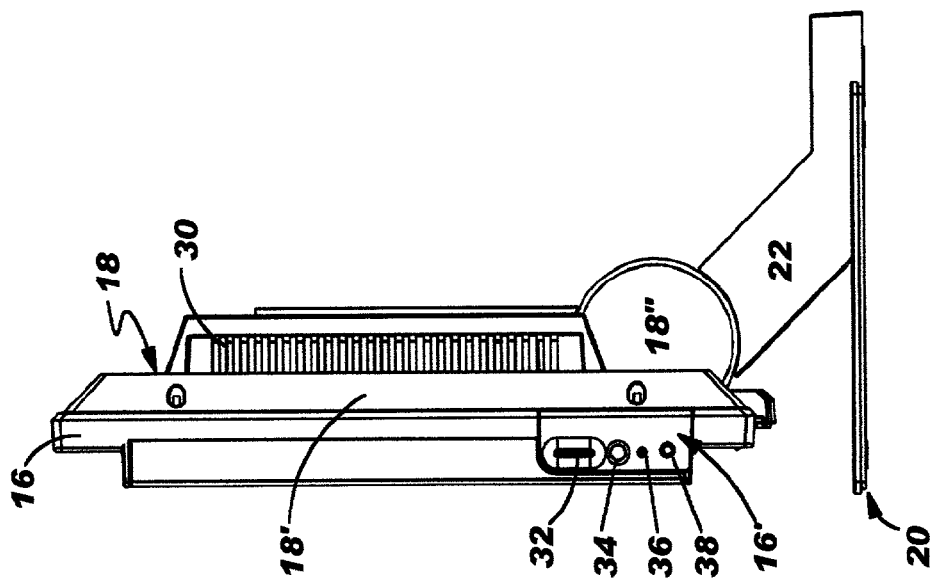
FIG. 6 shows a plan side view of the integrated speaker assembly fully mounted on the monitor according to the teachings of the present invention.
Figure 5:
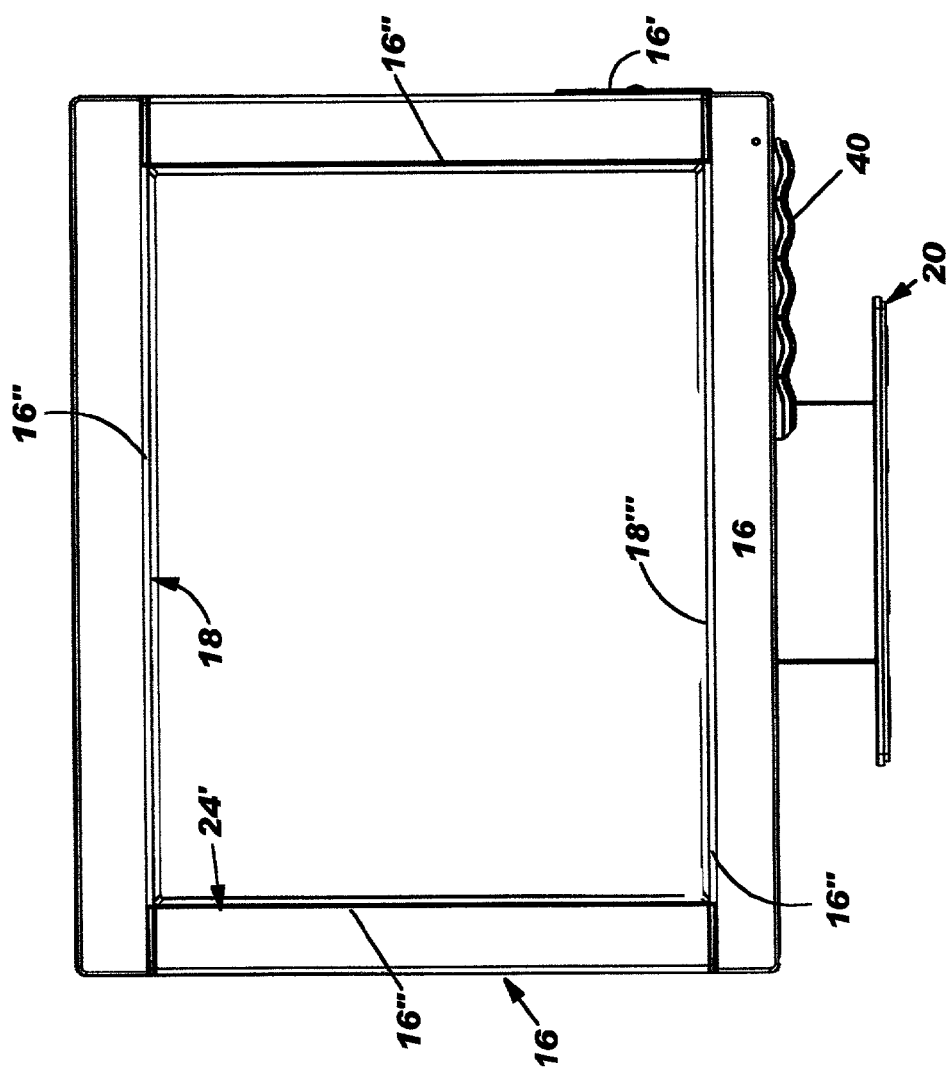
FIG. 5 shows a plan front view of the integrated speaker assembly fully mounted on the monitor according to the teachings of the present invention.

FIGS. 5 and 6 show front plan view and side plan view of the integrated bezel speaker assembly fully mounted on the bezel of the flat panel monitor 18. A plurality of openings 30 are provided in housing 18'. The openings 30 provide cooling to the internals of the flat panel monitor 18. The speaker bezel 16 is fabricated with a flange 16' that contains a plurality of openings through which rotary wheel 32 that adjusts the volume of the speaker protrudes. ON/OFF switch 34 that controls power to the integrated bezel speaker assembly also protrudes through one of the holes in the flange and also collects control support bracket 16'. An indicator 36 also protrudes through holes in the control bracket 16' and headphone jack 38 which accepts a headphone cable (not shown) is also provided through the control bracket 16'.

Still referring to FIGS. 5 and 6, controls 40 are provided at the bottom of the flat panel display and are used for controlling the operation of the monitor. The controls are conventional controls and will not be discussed further in this application. As can be seen in FIG. 5, when the integrated bezel speaker assembly is fully seated on the flat panel display the surface (monitor bezel) and surface 16' (speaker bezel) are orientated in juxtaposition surrounding the viewing screen of the monitor. The other surfaces of the monitor bezel are fully coupled by the integrated monitor bezel 16.

FIG. 8 shows a rear plan view of the integrated bezel speaker assembly fully mounted on the flat panel monitor. A mesh of lattice opening 24 provides cooling to the internals of the monitor. The speaker bezel 16 is also shown in this plan rear view fully mounted on the flat panel monitor.

FIG. 7 shows a top plan view of the integrated bezel speaker assembly 16 mounted on the flat panel monitor 18. A plurality of openings 42 provide cooling to the inside components of monitor 18. The integrated bezel 16 fully covers the monitor bezel in this view. Brackets 44 and 46 are fabricated in the speaker bezel and define the area on the speaker bezel whereat the speaker subassembly (details set forth hereinafter) is mounted. It should be noted that coupler 18", pedestal 22 and base 20 of monitor 18 are also seen from this top plan view.

FIG. 9, including FIGS. 9A–9E, shows the cross-section of the speaker bezel assembly and the monitor. FIG. 9A shows section CC and FIG. 9E shows section XO—XO. FIG. 9D, detail C, shows the right side speaker assembly. The components in the right side speaker assembly are captioned "R". For example, the right speaker is captioned "R speaker" and so forth. The coaction between monitor bezel 120, monitor housing 118 and speaker bezel 116 are clearly shown. In particular, the speaker bezel 116 has a flat surface and a channel riding against monitor bezel 120.

FIG. 9, including FIGS. 9A–9E, shows the cross-section of the speaker bezel assembly and the monitor. FIG. 9A shows section CC and FIG. 9E shows section XO—XO. FIG. 9D, detail C, shows the right side speaker assembly. The components in the right side speaker assembly are captioned "R". For example, the right speaker is captioned "R speaker" and so forth. The coaction between monitor bezel 120, monitor housing 118 and speaker bezel 116 are clearly shown, with the speaker assemblies disposed in front of the monitor bezel 120 and with the speaker bezel 116 and the speaker assemblies not extending substantially laterally beyond the monitor bezel 120. In particular, the speaker bezel 116 has a flat surface and a channel riding against monitor bezel 120.

FIG. 9B, detail A, shows the coaction between monitor housing 118, monitor bezel 120 and speaker bezel 116.

Having described the integral bezel speaker assembly in combination with the flat panel monitor the integral bezel speaker assembly alone will now be described.

Figure 10:
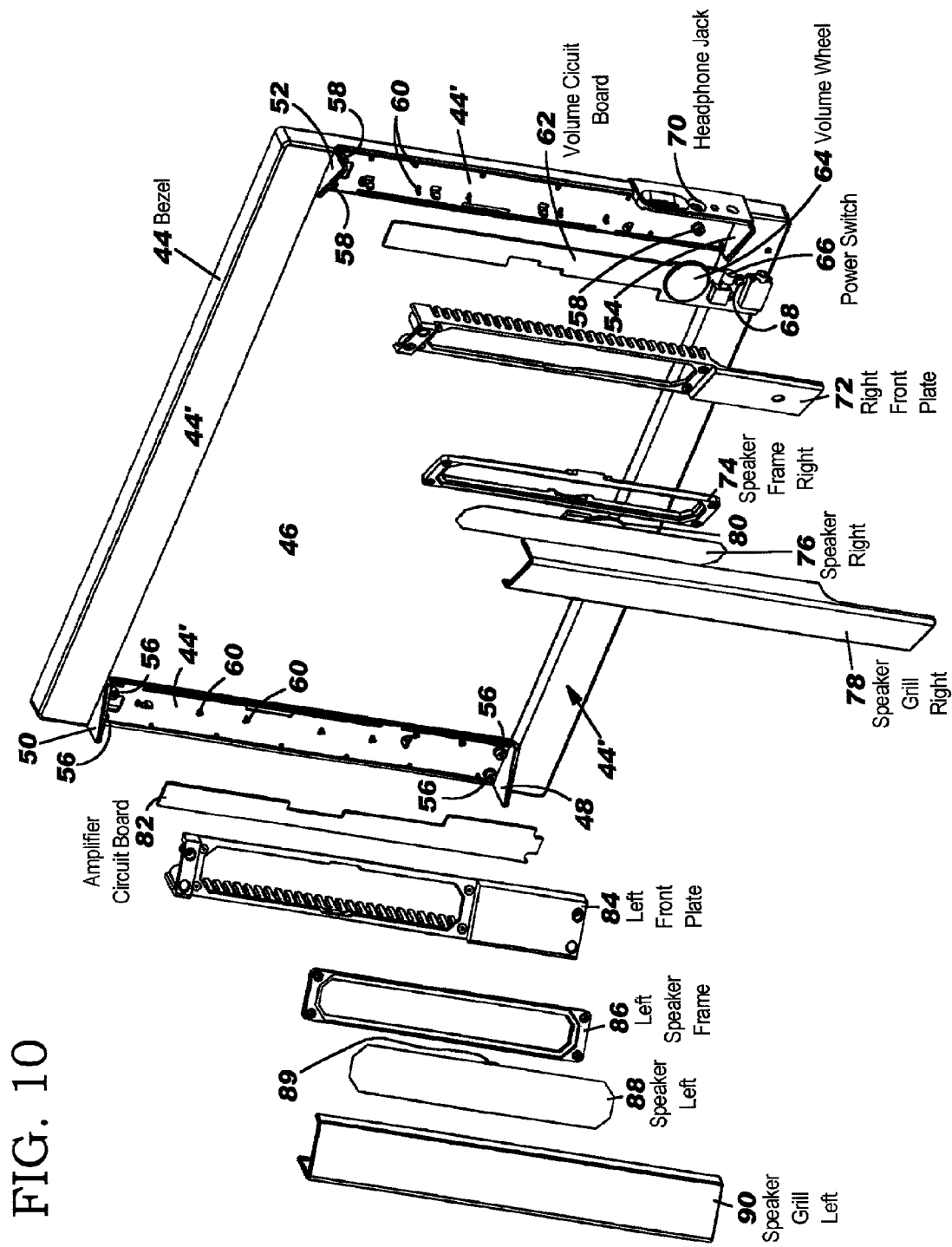
FIG. 10 shows a front perspective view of the integrated speaker assembly with the speaker system disassembled to show its components according to teachings of the present invention.
Figure 15:
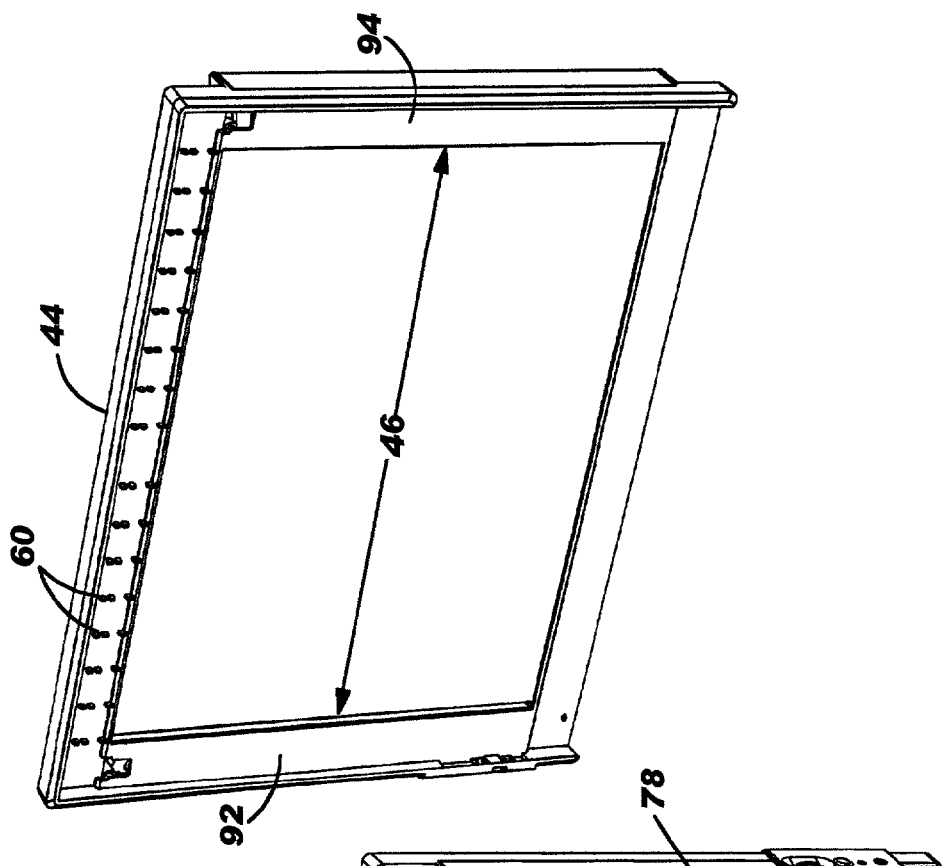
FIG. 15 shows a rear perspective view of the speaker assembly according to the teachings of the present invention.
Figure 14:
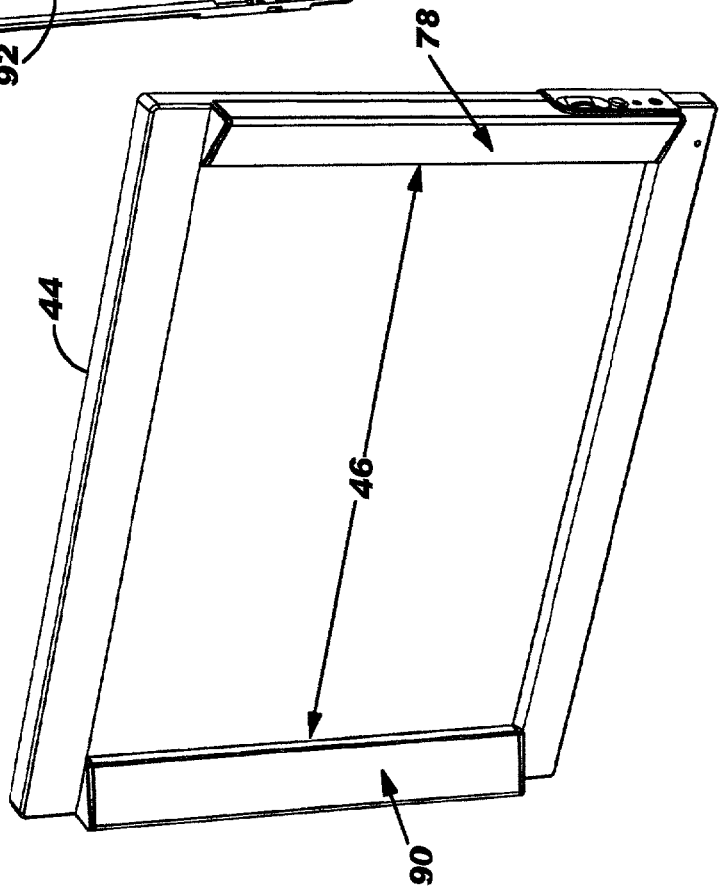
FIG. 14 shows a front perspective view of the speaker assembly according to the teachings of the present invention.

FIGS. 10, 14 and 15 show front prospective views and rear prospective view of the integrated bezel speaker assembly according to the teachings of the present invention. The integrated bezel speaker assembly includes a bezel 44 having a plurality of side members 44' integrally connected and surrounding an opening 46. When mounted to the bezel of a monitor the opening provides the space through which the flat panel display can be viewed. Preferably the bezel 44 is dye cast from hard rubber or plastic material. For purposes of discussion the right side of the Figures correspond with the right side of someone viewing the Figures. Likewise, the left side of the Figures correspond to the left side of someone viewing the Figures. With this orientation the bezel casting includes a pair of left brackets 48 and 50 and a pair of right brackets 52 and 54. The left brackets 48 and 50 indicate the area whereat the left speaker assembly, shown disassembled in FIG. 10 and assembled in FIG. 14, is to be mounted.

Similarly, right brackets 52 and 54 delineate the area in the bezel where the right speaker assembly is to be mounted. Bosses 56 and 58 are fabricated in the areas for the left speaker assembly and the areas for the right speaker assembly. The bosses coact with fastening elements (such as screws, not shown) to hold the other components of the respective speaker assembly firmly against the bezel 44. A plurality of guide members shown as dots, two of which are identified by numeral 60, form guides or harnesses through which wires are routed.

Still referring to FIG. 10, the right side speaker assembly includes volume circuit board 62 on which electrical circuits (to be discussed hereinafter), volume wheel 64, power switch 66, LED 68 and a jack receptacle 70 are mounted. The volume circuit board 62 and the enunciated components including electrical circuitry (to be discussed hereinafter) are mounted on the board and the board is firmly attached in the area between brackets 52 and 54, respectively. The volume wheel 64, power switch 66, Light Emitting Diode 68 and the headphone receptacle 70 protrude through appropriate openings provided in the control and connector support bracket 70. It should be noted that the control support bracket 70 is part of the casting of bezel 44. The right speaker assembly further includes a right front plate 72, right speaker frame 74, right speaker 76, and right speaker grill 78. The right speaker 76 is a flat panel speaker driven by magnetic driver 80. The magnetic driver 80 is coupled to the electrical circuit (to be described hereinafter). Adhesive member 80 connects the right speaker 76 to speaker frame 74. The speaker frame and attached flat panel speaker is then fixedly connected to the right front plate 72 by screws or any other suitable connectors. The same connectors or others if necessary are used to connect the right front plate 72 to the bezel 44. A right speaker grill 78 which is a decorative covering coacts with bezel 44 to cover the flat panel speaker and other components forming the right speaker assembly 78 (FIG. 14).

Still referring to FIG. 10, the left speaker assembly includes an amplifier circuit board 82, a left front plate 84, a left speaker frame 86, a left flat panel speaker 88 with magnetic driver 89 and a left speaker grill 90. The disassembled components on the left speaker assembly are assembled in a way similar to that described for the right speaker assembly. In the embodiment shown the power amplifier that provides power to the speaker is mounted on a separate circuit board with circuits and is wired to the right side speaker and circuits on the volume circuit board 62. However, this should not be a limitation on the scope of this invention because it is a designer's choice to mount all the electric components and circuitry on one circuit board or two circuit boards as is shown in the Figure. The partitioning of the electrical components is a matter of design choice and does not limit the scope of the invention. Turning to FIG. 14 for the moment, the assembled left side speaker assembly and right side speaker assembly and the bezel are shown. The left speaker grill 90 and right speaker grill 78 form decorative covers for the respective speaker assembly.

It should be noted that although the invention is described as using flat panel speakers this teaching is only illustrative and should not be construed as a limitation on the scope of the invention, since any type of speakers, including but not limited to cone-based transducers, can be used without deviating from the teachings of the present invention.

FIG. 15 shows a rear prospective view of the integrated bezel speaker assembly. Surfaces 92 and 94 ride against the front surface of the monitor bezel when the bezel assembly is attached or removed from the flat panel monitor.

Figure 11:
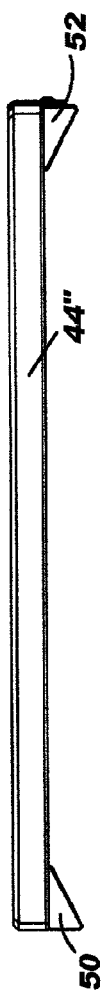
FIG. 11 shows a top plan view of the integrated speaker assembly according to the teachings of the present invention.

FIG. 11 shows a top plan view of the integrated bezel speaker assembly according to the teachings of the present invention. The top plan view shows top surface 44" and brackets 50 and 52. As stated before, brackets 50 and 52 delineate the area whereat the right side speaker assembly and left side speaker assembly are mounted.

Figure 12:
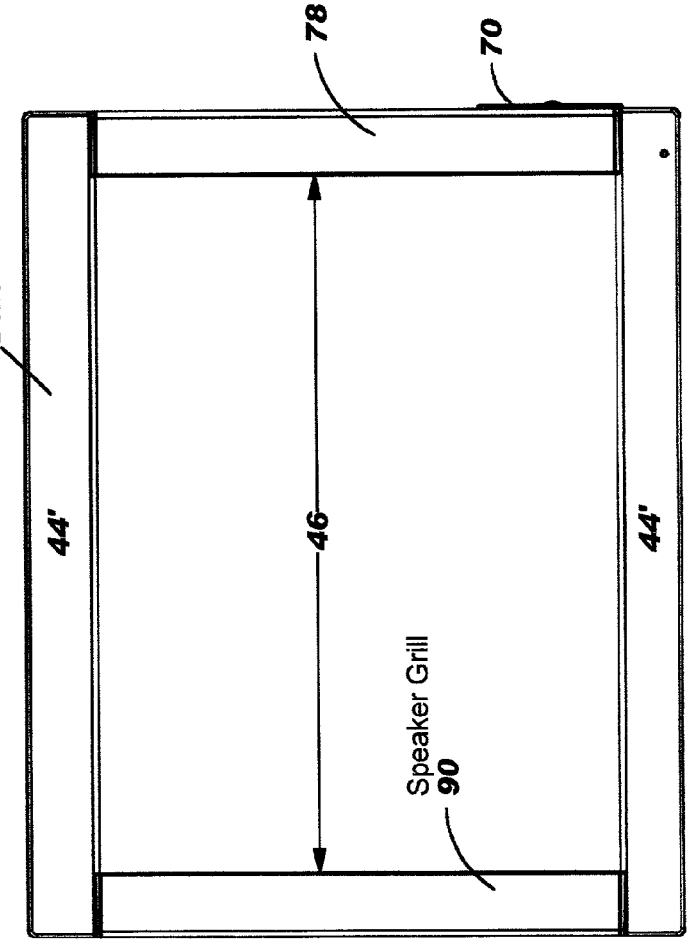
FIG. 12 shows a front plan view of the speaker assembly according to the teachings of the present invention.

FIG. 12 shows a front plan view of the integrated bezel speaker assembly according to the teachings of the present invention. The view shows opening 46 through which the flat panel display screen is viewed when the integrated bezel speaker assembly is mounted to a flat panel monitor. The right speaker grill 78, left speaker grill 90, top front surface 44' and bottom front surface 44' of the speaker bezel is also shown.

Figure 13:
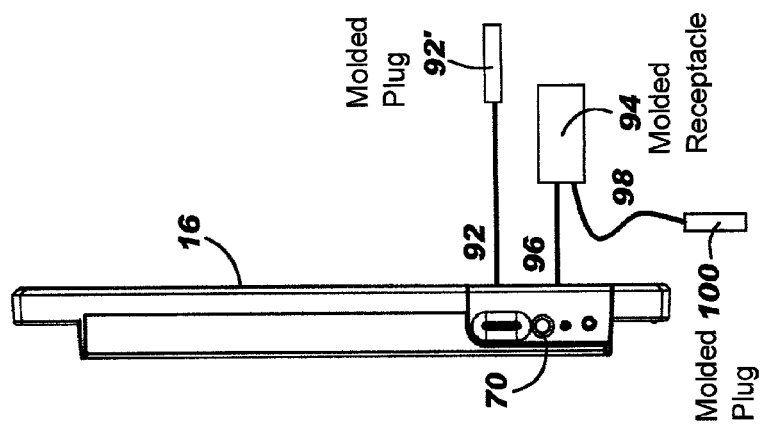
FIG. 13 shows a side plan view with signal and power conductors of the speaker assembly according to the teachings of the present invention.

FIG. 13 shows a right side plan view of the integrated bezel speaker assembly according to the teachings of the present invention. The view shows the controls and bracket 70 with control components (previously described protruding there through. In addition, audio conductor 92 is operatively connected to circuits (to be described hereinafter) on the right circuit board. A molded plug 92' is connected to one end of conductor 92. The plug 92' coacts with a sound card on a computer or like device to provide audio signals to the speaker system. A power distribution system comprising of molded receptacle 94, conductors 96, 98 and molded plug 100 is also provided. The molded receptacle 98 is attached to a power source to provide a desired voltage. Conductor 98 and molded plug 100 provide power to the monitor on which integrated bezel speaker 16 is mounted. Likewise, conductor 96 provides power to the circuitry on the right circuit board from which it is distributed over suitable cabling to the left speaker assembly.

The flat panel speakers are based upon conventional technology. Therefore, further description is not warranted.

Figure 16:
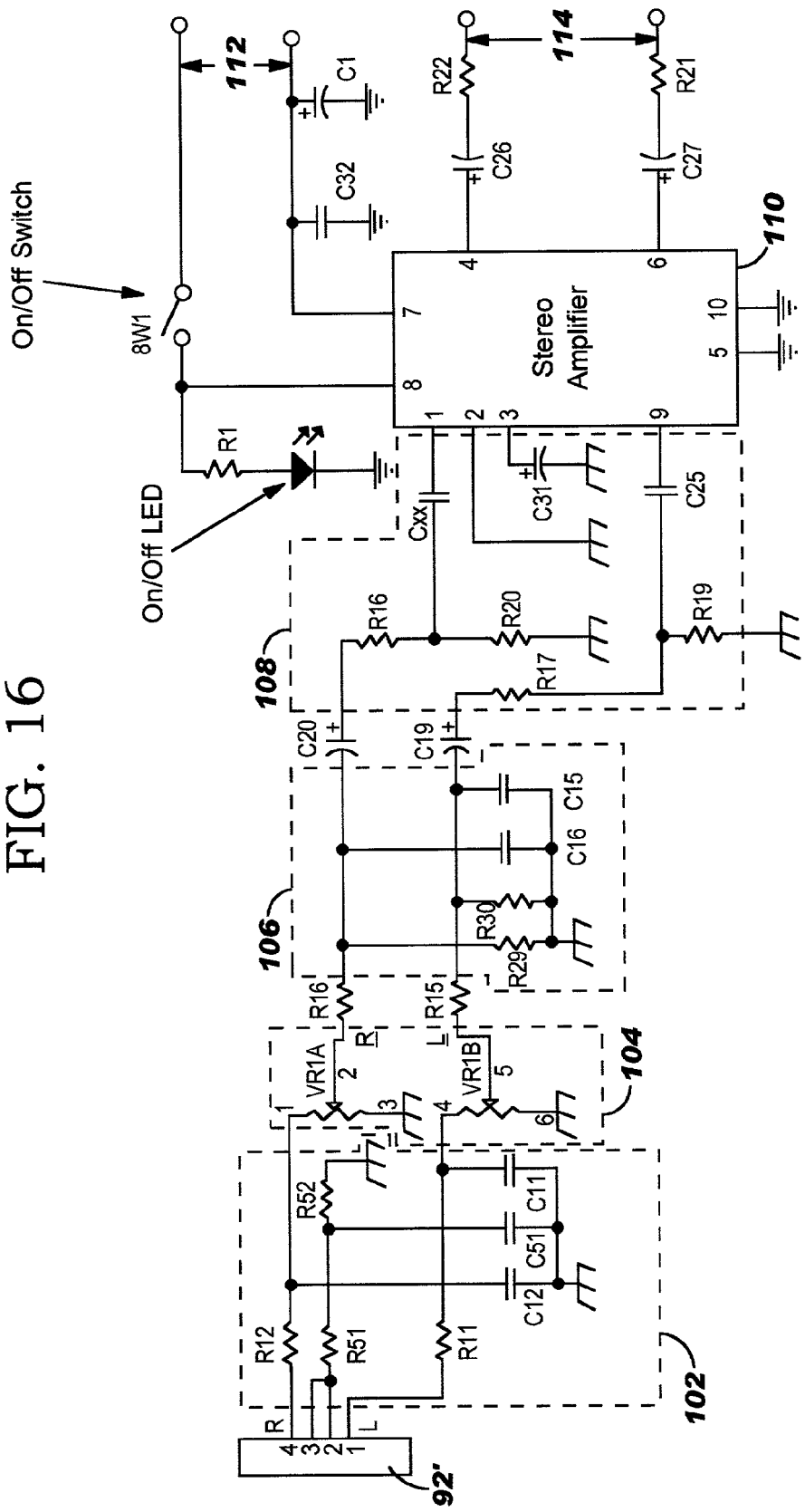
FIG. 16 shows a schematic of the electrical circuit that drives the speaker.

FIG. 16 shows a schematic for the electrical circuit that drives the flat panel speakers and other components of the integrated speaker assembly. The molded plug 92' connects to a PC output jack (not shown) and provides an analog audio input signal. Power to the circuitry is provided at terminal 112 while terminal 114 provides the output from stereo amplifier 110 that drives a magnet which vibrates the flat panel speaker. Even though any type of stereo amplifier can be used in the circuit arrangement in the preferred embodiment of this invention stereo amplifier 110 is the Phillips TDA 1517 manufactured by Phillips. This particular amplifier has a fixed gain of approximately 20 dB. The ON/OFF LED indicator is coupled through resistor R1 to an OFF switch and one input of the stereo amplifier. The ON/OFF switch controls the power to the amplifier while the LED tells if the amplifier is on or off. The other functional components of the circuit include high frequency EMC filtering circuit 102, volume wheel control circuit 104, low pass filter circuit 106 and high pass filter circuit 108. The high frequency EMC filtering circuit 102 filters high frequency signals to minimize EMC problems associated with the circuit. The high frequence EMC filtering circuit includes capacitor C12, C11 and C31 which are coupled to the audio signal input lines and ground potential as shown in the schematic. The volume wheel control circuit 104 includes dual variable resistors VR1A and VR1B (dual potentiometers) that are coupled to the volume control wheel and control the volume of the speakers. The low pass filter circuit 106 and the high pass filter circuit 108 define the frequency range over which the speakers are permitted to operate. Capacitors C16 and C15 in the circuit provide the 3 dB cut-off frequency low pass filter. Likewise, the high pass cut off frequency is controlled by high pass filter circuit 108. Capacitors C31 and C25 in the circuit 108 provide the 3 decibel cut-off frequency for high pass filter. In the preferred embodiment of this invention 0.01 uF is used to filter frequency below 300 MHZ. In the low frequency cut-off filter a 1200 pf for a 3 dB cut-off frequency of 20 kilohertz was used. Table 1 lists values for the components used in FIG. 16. In Table 1 component names are listed on the left-hand side and component values are listed on the right-hand side. For example $R_1$ is a resistor value 1K ohms and so forth. These values are only examples of a specific embodiment and should not be used to limit the scope or teaching of the present invention.

TABLE 1

| NAME OF COMPONENT | VALUE OF COMPONENT |
| --- | --- |
| R12, R51, R11 | 0 ohm |
| C12, C51, C11 | 10 pf |
| R15, R16 | 4.7K ohm |
| R29, R30 | not populated |
| C15, C16 | 1200 pF |
| C19, C20 | 0.22 uF |
| R16, R17 | 0 ohm |
| R19, R20 | not populated |
| C25, Cxx | 0.01 uF |
| C31 | 100 uF |
| C26, C27 | 220 uf |
| R21, R22 | 0 ohm |
| C32 | .1 uF |
| C1 | 470 uF |
| R1 | 1K ohm |

Based upon the above description and drawings, it will be understood by those skilled in the art that the particular embodiments shown and described herein are for purposes of illustration only and are not intended to limit the scope of the invention. Those skilled in the art will recognize that the invention may be embodied in other specific forms without departing from its spirit or central characteristics. References to details of particular embodiments are not intended to limit the scope of the claims.

In summary, the speaker system described herein includes the following benefits and advantages:

1) provide a "slip-on" means to provide an "integrated looking" speaker option 2) that doesn't inhibit the monitors degree and range of rotation/skew/movement, 3) that doesn't require the addition of mechanical/electrical hooks made in the original flat panel monitor (adding unnecessary additional cost to the monitor), 4) allowing a customer to configure a 3×3 checkboard of flat panel monitors on a wall, with all the monitors pressed up against one another—whereby this speaker product doesn't interfere with the adjacent monitor's image, for example in a company's lobby or conference room.

5) aesthetically pleasing by only having 2 wires come out of the speaker product—a power cord (which is very short and mounts to the monitor, so it may not be visible anyway, and the audio signal cable which plugs into the PC's line-out jack. Having many visible wires attaching the desktop mounted speakers (current art of most PCs) is a common customer complaint, in which we made our invention the way we did, to solve as well.

6) our invention can be used with any type of speakers including flat panel, Cone technology, etc.

7) providing the 0 footprint to both the desk and the monitor.

What is claimed is:

1. An assembly to provide audio including:
 a speaker bezel having side members integrally connected to extend along opposite sides of an opening;
 a structure that allows the speaker bezel to slide onto a display bezel of a display device and that retains the speaker bezel onto said display bezel, fabricated on said side members;
 a first speaker assembly operatively integrated on a first one of the side members, to be disposed in front of said display bezel;
 a second speaker assembly operatively integrated on a second one of said side members, to be disposed in front said display bezel; and an electronic assembly that provides power and drive signals operatively mounted on said bezel.

2. The assembly of claim 1 wherein the structure includes a pair of channels with each one of the pair of channels fabricated on opposite ones of said side members.

3. The assembly of claim 1 wherein at least one of the speaker assemblies includes a member with openings to emit sounds and holes to accept screws to attach said member to the speaker bezel;
a speaker frame with holes that accept screws to attach said speaker frame to the member; and
a flat panel speaker mounted to said speaker frame.

4. The assembly of claim 3 further including a speaker grill that coacts with the speaker bezel to cover the flat panel speaker.

5. The assembly of claim 1 wherein external dimensions and geometric configuration of the speaker bezel and display bezel are substantially identical.

6. The assembly of claim 3 further including a rotary wheel to adjust volume of said speakers.

7. The assembly of claim 6 further including a switch to activate power to said speakers.

8. The assembly of claim 7 further including an indicator that illuminates when power is applied to said speakers.

9. An assembly to provide audio including:
a speaker bezel having side members integrally connected to extend along opposite sides of an opening therebetween;
a structure that allows the bezel to slide onto at least one surface of a device and retains the bezel onto said surface is fabricated on spaced ones of said side members;
first and second speaker assemblies, wherein said first speaker assembly is operatively integrated on a first one of the side members, wherein said, second speaker assembly is operatively integrated on a second one of said side members, and wherein at least one of the speaker assemblies includes a member with openings to emit sounds to attach said member to the speaker bezel; and
an electronic assembly that provides power and drive signals operatively mounted on said bezel, wherein the electronic assembly includes:
at least one circuit board connected to the bezel;
a stereo amplifier mounted on said circuit board, said stereo amplifier having at least a first port that receives electrical power signals, a third port to provide amplified audio signals to the flat panel speakers, and a second port that receives audio signals;
an ON/OFF switch operatively coupled to the first port;
an ON/OFF LED operatively coupled to the ON/OFF switch;
high pass filtering circuit operatively coupled to the second port;
low pass filtering circuit operatively coupled to the high pass filtering circuit; and
EMC high pass filtering circuit operatively coupled to the low pass filtering circuit.

10. The assembly of claim 9 further including:
a first conductor that transmits audio signals operatively connected to the EMC high pass filtering circuit; and
a connector operatively connected to the first conductor.

11. The assembly of claim 10 further including a second conductor that transmit electrical power having a first end operatively connected to the ON/OFF switch and a second end operatively coupled to a molded receptacle.

12. The assembly of claim 11 further including a third conductor that transmits power having a first end operatively coupled to the molded receptacle and a second end connected to a molded plug.

13. The assembly of claim 4 further including a driver for driving the flat panel speaker.

14. The assembly of claim 13 wherein the driver includes magnetics.

15. The assembly of claim 1 wherein the speaker assembly includes flat panel speakers.

16. The assembly of claim 1, wherein the speaker assembly includes cone-based speakers.

17. A speaker system including:
a frame including a speaker bezel surrounding an opening in a display bezel of a display device through which a screen within the display bezel is viewed when the speaker system is attached to the display bezel;
at least one speaker assembly mounted to said frame; and
a first structure integrated in the frame to attach the speaker system to the display bezel in such a way that the speaker system extends across the display bezel without substantially extending laterally beyond the display bezel, wherein the first structure includes channel fabricated in said bezel for sliding over the display speaker bezel.

18. A speaker system including:
a frame
at least one speaker assembly mounted to said frame;
a first structure integrated in the frame to attach the speaker system to a display bezel of a display device in such a way that the speaker system extends across the display bezel without substantially extending laterally beyond the display bezel;
at least one circuit board connected to the bezel;
a stereo amplifier mounted on said circuit board, said stereo amplifier having at least a first port that receives electrical power signals, a third port to provide amplified audio signals to the flat panel speakers, and a second port that receives audio signals;
an ON/OFF switch operatively coupled to the first port;
a high pass filtering circuit operatively coupled to the second port;
a low pass filtering circuit operatively coupled to the high pass filtering circuit; and
an EMC high pass filtering circuit operatively coupled to the low pass filtering circuit.

19. The assembly of claim 1, wherein said side members are integrally connected by an upper member extending above said opening and a lower member extending below said opening.

20. The assembly of claim 1, wherein said structure allows said speaker bezel to slide into juxtaposition with said display bezel.

21. An assembly to provide audio including:
a speaker bezel having side members integrally connected to extend along opposite sides of an opening;
a structure that allows the speaker bezel to slide onto a display bezel of a display device and that retains the speaker bezel on said display bezel, into juxtaposition with said display bezel, fabricated on said side members;
a first speaker assembly operatively integrated on a first one of the side members;
a second speaker assembly operatively integrated on a second one of said side members; and an electronic assembly that provides power and drive signals operatively mounted on said bezel, wherein the electronic assembly includes:
  at least one circuit board connected to the bezel;
  a stereo amplifier mounted on said circuit board, said stereo amplifier having at least a first port that receives electrical power signals, a third port to provide amplified audio signals to the speaker assemblies, and a second port that receives audio signals;
  an ON/OFF switch operatively coupled to the first port;
  a high pass filtering circuit operatively coupled to the second port;
  a low pass filtering circuit operatively coupled to the high pass filtering circuit; and
  an EMO high pass filtering circuit operatively coupled to the low pass filtering circuit.

* * * * *

UNITED STATES PATENT AND TRADEMARK OFFICE
CERTIFICATE OF CORRECTION

| | | |
|---|---|---|
| PATENT NO. | : 6,999,595 B2 | Page 1 of 1 |
| APPLICATION NO. | : 10/158663 | |
| DATED | : July 5, 2005 | |
| INVENTOR(S) | : Anderson et al. | |

It is certified that error appears in the above-identified patent and that said Letters Patent is hereby corrected as shown below:

DELETE THE PARAGRAH AT COLUMN 5, LINES 4-13

INSERT AT COLUMN 5, LINE 28 THE FOLLOWING PARAGRAPH:

-- FIG. 9, including FIGS. 9A–9E, shows the cross-section of the speaker bezel assembly and the monitor. FIG. 9A shows section CC and FIG. 9E shows section XO—XO. FIG. 9D, detail C, shows the right side speaker assembly. The components in the right side speaker assembly are captioned "R". For example, the right speaker is captioned "R speaker" and so forth. The coaction between monitor bezel 120, monitor housing 118 and speaker bezel 116 are clearly shown. In particular, the speaker bezel 116 has a flat surface and a channel riding against monitor bezel 120. --

COLUMN 10 LINES 24 AND 25 SHOULD READ AS FOLLOWS:
-- nel fabricated in said speaker bezel for sliding over the display bezel. --

COLUMN 12 LINE 7, PLEASE DELETE "EMO" AND INSERT --EMC--

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,999,595 B2 |
| APPLICATION NO. | : 10/158663 |
| DATED | : February 14, 2006 |
| INVENTOR(S) | : Anderson et al. |

It is certified that error appears in the above-identified patent and that said Letters Patent is hereby corrected as shown below:

DELETE THE PARAGRAH AT COLUMN 5, LINES 4-13

INSERT AT COLUMN 5, LINE 28 THE FOLLOWING PARAGRAPH:

-- FIG. 9, including FIGS. 9A–9E, shows the cross-section of the speaker bezel assembly and the monitor. FIG. 9A shows section CC and FIG. 9E shows section XO—XO. FIG. 9D, detail C, shows the right side speaker assembly. The components in the right side speaker assembly are captioned "R". For example, the right speaker is captioned "R speaker" and so forth. The coaction between monitor bezel 120, monitor housing 118 and speaker bezel 116 are clearly shown. In particular, the speaker bezel 116 has a flat surface and a channel riding against monitor bezel 120. --

COLUMN 10 LINES 24 AND 25 SHOULD READ AS FOLLOWS:
-- nel fabricated in said speaker bezel for sliding over the display bezel. --

COLUMN 12 LINE 7, PLEASE DELETE "EMO" AND INSERT --EMC--

This certificate supersedes Certificate of Correction issued April 17, 2007.

Signed and Sealed this

Eighth Day of May, 2007

JON W. DUDAS
*Director of the United States Patent and Trademark Office*